(12) United States Patent
Whalen

(10) Patent No.: US 6,589,589 B2
(45) Date of Patent: Jul. 8, 2003

(54) METHOD OF PROCESSING SOY FLOUR

(76) Inventor: Paul Whalen, 200 Fifth St. NW., Suite L, Elk River, MN (US) 55330

( * ) Notice: Subject to any disclaimer, the term of this patent is extended or adjusted under 35 U.S.C. 154(b) by 0 days.

(21) Appl. No.: 09/861,888

(22) Filed: May 21, 2001

(65) Prior Publication Data

US 2002/0004095 A1 Jan. 10, 2002

Related U.S. Application Data

(60) Provisional application No. 60/206,010, filed on May 19, 2000.

(51) Int. Cl.⁷ .............................. A23L 1/20; A23L 1/211
(52) U.S. Cl. ........................ 426/634; 426/511; 426/519
(58) Field of Search ................................. 426/634, 511, 426/519

(56) References Cited

U.S. PATENT DOCUMENTS

| | | | |
|---|---|---|---|
| 3,764,708 A | * 10/1973 | Aonuma et al. | |
| 3,995,071 A | 11/1976 | Goodnight, Jr. et al. | 426/598 |
| 3,998,800 A | 12/1976 | Youngquist | 260/123.5 |
| 4,038,431 A | 7/1977 | Hildebolt | 426/511 |
| 4,038,432 A | 7/1977 | Hildebolt et al. | 426/511 |
| 4,044,157 A | 8/1977 | Wilding | 426/250 |
| 4,054,679 A | 10/1977 | Melcer et al. | 426/656 |
| 4,062,987 A | 12/1977 | Hildebolt | 426/641 |
| 4,091,120 A | 5/1978 | Goodnight, Jr. et al. | 426/598 |
| 4,125,465 A | 11/1978 | Turovsky et al. | 210/46 |
| 4,128,051 A | 12/1978 | Hildebolt | 99/348 |
| 4,146,534 A | 3/1979 | Armstrong | 260/123 |
| 4,168,657 A | 9/1979 | Hildebolt | 99/483 |
| 4,205,094 A | 5/1980 | Baird | 426/459 |
| 4,209,541 A | 6/1980 | Clatfelter et al. | 426/430 |
| 4,226,576 A | 10/1980 | Hildebolt | 425/69 |
| 4,245,552 A | 1/1981 | Small et al. | 99/483 |
| 4,291,063 A | 9/1981 | Ridgway | 426/319 |
| 4,359,480 A | * 11/1982 | Kock | |
| 4,556,571 A | 12/1985 | Swartz et al. | 426/265 |
| 5,271,163 A | 12/1993 | Pikus et al. | 34/33 |
| 5,275,833 A | 1/1994 | Schmidt | 426/253 |
| 5,936,069 A | 8/1999 | Johnson | 530/378 |
| 6,098,307 A | 8/2000 | Pikus | 34/368 |

FOREIGN PATENT DOCUMENTS

JP          57-152865    *  9/1982

* cited by examiner

Primary Examiner—Anthony J. Weier
(74) Attorney, Agent, or Firm—Patterson, Thuente, Skaar & Christensen, P.A.

(57) ABSTRACT

A method of processing a soybean material including feeding the soybean material into a reactor. The soybean material is stirred with a paddle in the reactor so that the soybean material forms a thin film on an inner surface of the reactor. Steam is injected into the reactor. The soybean material is passed through a drying cyclone. The dried soybean material is fully functional and has substantially no off-flavor.

20 Claims, No Drawings

METHOD OF PROCESSING SOY FLOUR

RELATED U.S. APPLICATION DATA

This application claims priority to U.S. Provisional Application Ser. No. 60/206,010, filed May 19, 2000.

FIELD OF THE INVENTION

The present invention relates generally to a method of processing soy flour. More particularly, the present invention relates to a method of processing soy flour to reduce the off-flavor.

SUMMARY OF THE INVENTION

Soybean flour or soy flour is a nutritious, high protein ingredient used in numerous food formulations. Soy flour is generally the flour produced by milling the whole, dehulled soybean. Flour or meal is made from fat extracted soybeans by numerous well-known means. Defatted flour or soybean concentrate is commonly used to make texturized soy product by extrusion processes. Soy protein isolates are produced by fractionating soy flour or concentrate to obtain functionality and other desirable attributes.

All soy products suffer from a beany flavor claimed to be the primary result of lipases and lipoxygenase (Lusas, *Oil Seeds and Oil-bearing Materials,* Chpt. 11, p.297, Handbook of Cereal Science & Technology, 2000) or a component of the carbohydrate fraction (Swartz, U.S. Pat. No. 4,556,069). Lipase and lipoxygenase produces a range of rancid flavors through action on the fat in the soy flour or concentrate.

The primary method for removal of lipase/lipoxygenase is to thermally inactivate the enzyme. This is commonly done in the fat extraction process using cracked or coarse pieces of the soybeans. Flour is not employed. Clatfelter, U.S. Pat. No. 4,209,541, used a unhulled, whole soybeans in a process that steamed then heat treated the whole bean in hot air followed by cracking and dehulling. A flour was then made under modified atmosphere (nitrogen) to pulverize the material into flour.

To remove flavors, generally, flour is made into an aqueous slurry and treated to reduce off-flavors. Alternatively, the flour is defatted and presented as a flake (Johnson, U.S. Pat. No. 5,936,069) or texturized by an extrusion or other cook process and then treated to remove beany or off-flavors. In slurry form, the slurry is cooked under pressure (Hildebolt, U.S. Pat. No. 4,168,657; Melcer et al., U.S. Pat. No. 4,054,679; Hildebolt et al., U.S. Pat. No. 4,038,432; Hildebolt, U.S. Pat. No. 4,038,431) or extruded with steam injection during (Hildebolt, U.S. Pat. No. 4,128,051) or treated post-extrusion by thermal process (Small, U.S. Pat. No. 4,245,552).

Alternatively, de-flavoring can be done by hydrating or making a slurry then centrifuging (spinning) the protein out as a fibrous material, separating it from the fluid (Hildebolt, U.S. Pat. Nos. 4,226,576 and 4,062,987). Steam is used to heat the slurry in U.S. Pat. No. 4,226,576 by a common device known as a jet-cooker to achieve temperatures in excess of 300° F. Use of a hydrocyclone is taught in Armstrong, U.S. Pat. No. 4,146,534 to wash the protein, separating it from debris material. Ultrafiltration can also be employed in removal of flavor components (Goodnight Jr. et al., U.S. Pat. Nos. 3,995,071 and 4,091,120).

Alternatively, soy flour (including texturized soy flour) can be deflavored using masking properties of yeast for meat applications (Swartz, U.S. Pat. No. 4,556,571) or reacted with ammonia gas (Ridgway, U.S. Pat. No. 4,291,063) or using a solvent system (Youngquist, U.S. Pat. No. 3,998,800). Schmidt, U.S. Pat. No. 5,275,833 used hydration and bleaching agents to improve flavor.

As discussed above, thermal processing is generally recognized as means of removing the beany flavor in soy flours, however, the processes usually involve forming a slurry, pressure cooking and venting the volatile compounds. Kijima, U.S. Pat. No. 4,125,465 uses a process specific for texturized soy products in which superheated steam flows through a vessel in a fluidized manner. Other patents utilize slurries or even doughs that are then extruded into sheets or doughs and baked (Wilding, U.S. Pat. No. 4,044,157).

We discovered a process that will treat conventional, whole soybean flour—enzyme active—without forming a slurry, at atmospheric pressure and in a manner extremely conducive for ingredient use in a wide variety of products.

DETAILED DESCRIPTION OF THE PREFERRED EMBODIMENTS

The present invention is a method of processing soy flour to reduce the off-flavor. Soy flour processed according to the present invention has substantially no off-flavor while retaining substantially all of the functionality typically present in unprocessed soy flour.

In spite of the numerous nutritional benefits of soy flour, the potential applications in which soy flour may be used are limited by the off-flavor typically present in soy flour. Because soy flour processed according to the present invention eliminates the off-flavors, the soy flour may be used in a broader range of applications than was possible with conventional soy flour.

Whole, full fat, soybean flour commonly available as an "enzyme active" product of common grind (U.S. 90 mesh) or finer grind (500 to 1000 mesh) is fed into a reactor. The reactor includes a paddle assembly rotatably mounted therein. The reactor also preferably includes a jacket to control the temperature of the reactor. The reactor further preferably has the capability to inject steam into the interior of the reactor. A preferred embodiment of the reactor is described in Pikus et al., U.S. Pat. No. 5,271,163, the disclosure of which is incorporated herein by reference.

The reactor forms a thin film of material around the reactor cylinder that permits rapid heat transfer from the jacket wall and enables steam to be injected into the flour via injectors in the paddles. Water is optional since steam is injected. However, low amounts water may be added immediately after the solids feed port via a nozzle. The concentration of water added to the reactor is less than 10 percent by weight of the feed and preferably less than about 5 percent by weight of the feed.

The jacket temperature is preferably operated at between about 270 and 280° F. to aid in vaporizing the off-flavors. Surprisingly, the entire process is less than 5 minutes, preferably less than 1 minute and most preferably between about 15 and 30 seconds. As the product exits the reactor, the product is at a temperature of between about 230 and 245° F. under atmospheric conditions.

The product is passed through a cyclone that allows simple venting of the moisture and results in a dry product. The soy flour produced according to this process is bland with no beany, green or off-flavors and fully functional making it suitable for nutritional supplementation and use in food formulation.

The product is free flowing at all times. No slurry is formed and the high jacket temperatures maintain the water/ steam in a volatile form to remove the flavors. Product is stable under conventional packaging, with no reformation of beany, off-flavors.

Soy flour treated in this manner retains functionality as demonstrated by preparation of soy milk in Example 2 and soy yogurt in Example 3. If significant denaturation of the soy proteins occurs, the protein will precipitate in milk or fail to coagulate in yogurt. Soy flour produced in the above manner preserves protein functionality while removing the beany flavor.

The product and method of the present invention are described in the following examples. These examples are provided as an illustration of the invention and are not intended to limit the invention.

EXAMPLE 1

A processed soy flour was prepared to evaluate the process of the present invention. Soy flour was fed into a paddle-stirred reactor such as is disclosed in Pikus et al., U.S. Pat. No. 5,271,163, at a rate of about 175 pounds per hour. Water was fed into the reactor at a rate of up to about 8 pounds per hour. Steam was fed into the reactor at a rate of about 94 pounds per hour. A jacket extending around the reactor was maintained at a temperature of about 278° F.

The material exited form the reactor in about 15 to 30 seconds. The processed soy flour exiting from the reactor had a temperature of between about 230 and 243° F. After venting the processed soy flour had a moisture content of about 5.3 percent.

EXAMPLE 2

A soy milk was prepared to evaluate the soy flour prepared in Example 1. The following ingredients were added to a conventional blender: processed soy flour about 6.4 grams, sugar about 6.4 grams, water about 174.4 grams, and xanthum gum about 0.05 grams. The water was cooled to a temperature of approximately 50° F. prior to adding to the blender.

Water is added to the blender along with the soy flour, the sugar, and a drop of antifoam. The material was then blended for about 10 seconds. The product was heated to about 165° F. in a period of about 5 minute using a double boiler to pasteurize the milk product. The milk product was cooled to less than about 50° F. in an ice bath and bottled. Thereafter, the milk product was tasted and it was found that the milk product exhibited substantially no off-flavor.

This milk product was compared to untreated, treated and over-treated soy flour, which is available from North American Foods under the designation FSP Gold Soy Flour. The milk product made from the untreated flour retained a strong green, beany flavor. However, the untreated flour remained suspended and would not precipitate out. The milk product made from the over-treated soy flour resulted in a large amount of precipitated material on the bottom of the milk container. In contrast, the treated soy flour made a highly acceptable milk with no beany or off-flavors and no precipitate.

EXAMPLE 2

A soy yogurt was prepared using the processed soy flour prepared in Example 1. The following ingredients were added to a conventional blender: processed soy flour about 28.4 grams, sugar about 28.4 grams, water about 200 grams and one drop of anti-foam. The water was cooled to a temperature of approximately 50° F. prior to adding to the blender.

The ingredients were blended for approximately 10 seconds. Next, the mixture was heated in a double boiler to about 195° F. and held for approximately 5 minutes. The mixture was then cooled to about 115° F. and about 14.2 grams of yogurt starter culture was added. Next, the mixture was separated into cups and incubated at approximately 110° F. for about 3 hours to a pH of about 4.5. The yogurt product was then refrigerated. Thereafter, the yogurt product was tasted and it was found that the product exhibited substantially no off-flavor.

This yogurt product was compared to untreated, treated and over-treated soy flour, which is available from North American Foods under the designation FSP Gold Soy Flour. The yogurt made from the untreated flour retained a strong green, beany flavor. However, the material remained suspended and would not precipitate out. The over-treated product would not coagulate and form a gel when used to make a yogurt. In contrast, the yogurt made with the treated soy flour formed a strong gel and had a very clean flavor without beany taste.

It is contemplated that features disclosed in this application, as well as those described in the above applications incorporated by reference, can be mixed and matched to suit particular circumstances. Various other modifications and changes will be apparent to those of ordinary skill.

What is claimed is:

1. A method of processing a soybean material comprising:
    feeding the soybean material into a reactor;
    fluidizing the soybean material with a paddle and injection of steam through the paddle in the reactor so that the soybean material forms a thin film on an inner surface of the reactor; and
    passing the soybean material through a drying cyclone, wherein the dried soybean material is fully functional and has substantially no off-flavor.

2. The method of claim 1, wherein the soybean material is in the reactor for between about 15 and 30 seconds.

3. The method of claim 1, wherein fluidizing is accomplished through stirring at a rate of approximately 600 revolutions per minute.

4. The method of claim 1, wherein the reactor is maintained at a temperature of between about 250 and 280° F.

5. The method of claim 1, wherein the soy material exits the reactor at a temperature of between about 230 and 245° F.

6. The method of claim 1, and further comprising mixing water with the soybean material.

7. The method of claim 6, wherein the water is added at a concentration of less than about 5 percent by weight.

8. The method of claim 1, and further comprising grinding the soybean material to reduce an average particle size to less than 90 U.S. mesh.

9. A method of processing a soybean milk product comprising:
    feeding a soybean material into a reactor;
    fluidizing the soybean material with a paddle and injection of steam through the paddle in the reactor so that the soybean material forms a thin film on an inner surface of the reactor;
    passing the soybean material through a drying cyclone; and
    mixing the soybean material with water to form a milk product, wherein the milk product has substantially no off-flavor and exhibits a smooth texture.

10. The method of claim 9, wherein the soybean material is in the reactor for between about 15 and 30 seconds.

11. The method of claim 9, wherein fluidizing is accomplished through stirring at a rate of approximately 600 revolutions per minute.

12. The method of claim 9, and further comprising mixing the milk product with sugar.

13. The method of claim 9, and further comprising pasteurizing the milk product.

14. The method of claim 9, and further comprising mixing water with the soybean material.

15. A method of processing a soybean yogurt product comprising:

feeding a soybean material into a reactor;

fluidizing the soybean material with a paddle and injection of steam through the paddle in the reactor so that the soybean material forms a thin film on an inner surface of the reactor;

passing the soybean material through a drying cyclone; and mixing the soybean material with water and yogurt starter culture to form a yogurt product, wherein the yogurt product has substantially no off-flavor and forms a strong gel.

16. The method of claim 15, wherein the soybean material is in the reactor for between about 15 and 30 seconds.

17. The method of claim 15, and further comprising mixing the yogurt product with sugar.

18. The method of claim 15, and further comprising mixing the yogurt product with sugar.

19. The method of claim 15, wherein fluidizing is accomplished through stirring at a rate of approximately 600 revolutions per minute.

20. The method of claim 15, and further comprising mixing water with the soybean material.

* * * * *

UNITED STATES PATENT AND TRADEMARK OFFICE
CERTIFICATE OF CORRECTION

PATENT NO. : 6,589,589 B2
DATED : July 8, 2003
INVENTOR(S) : Paul Whalen

It is certified that error appears in the above-identified patent and that said Letters Patent is hereby corrected as shown below:

Title page,
Item [56], References Cited, U.S. PATENT DOCUMENTS, delete
"4,125,465 A  11/19/78  Turovsky et al. ...210/46" and replace with
-- 4,152,465 A  5/1979  Kijima et al……...426/455 --

Column 1,
Line 29, delete "4,556,069" and replace it with -- 4,556,571 --;
Line 36, delete the "a" before the word "unhulled"

Column 2,
Line 9, replace "4,125,465" with -- 4,152,465 --

Column 3,
Line 26, replace "form" with -- from --;
Line 37, replace "xanthum" with -- xanthan --;
Line 60, replace "EXAMPLE 2" with -- EXAMPLE 3 --

Column 6,
Lines 10-11, delete Claim 18 as it is a duplicate of Claim 17.

Signed and Sealed this

Seventeenth Day of February, 2004

JON W. DUDAS
*Acting Director of the United States Patent and Trademark Office*